US008763787B2

(12) United States Patent
Manning (10) Patent No.: US 8,763,787 B2
(45) Date of Patent: Jul. 1, 2014

(54) CONVEYOR

(75) Inventor: Cormac Manning, Celbridge (IE)

(73) Assignee: Lifestyle Foods, Dublin (IE)

( * ) Notice: Subject to any disclaimer, the term of this patent is extended or adjusted under 35 U.S.C. 154(b) by 0 days.

(21) Appl. No.: 13/387,455

(22) PCT Filed: Jul. 27, 2010

(86) PCT No.: PCT/EP2010/060872
§ 371 (c)(1),
(2), (4) Date: Jan. 27, 2012

(87) PCT Pub. No.: WO2011/012611
PCT Pub. Date: Feb. 3, 2011

(65) Prior Publication Data
US 2012/0125739 A1    May 24, 2012

(30) Foreign Application Priority Data

Jul. 30, 2009    (IE) .................................. S2009/0591

(51) Int. Cl.
*B65G 13/02* (2006.01)
(52) U.S. Cl.
USPC .......................... 198/778; 198/844.1; 198/835
(58) Field of Classification Search
CPC ..................................................... B65G 17/00
USPC ................................................. 198/778, 779
See application file for complete search history.

(56) References Cited

U.S. PATENT DOCUMENTS

| 4,351,429 | A | 9/1982 | Garvey |
| 2004/0011627 | A1 | 1/2004 | Palmaer et al. |
| 2006/0272931 | A1* | 12/2006 | Knott et al. ................... 198/853 |
| 2007/0119689 | A1* | 5/2007 | Stebnicki et al. ............. 198/778 |

FOREIGN PATENT DOCUMENTS

| EP | 0175483 | 3/1986 |
| EP | 1655242 | 5/2006 |

OTHER PUBLICATIONS

International Search Report and the Written Opinion of the International Searching Authority for application PCT/EP2010/060872, Dec. 6, 2010, 12 pp.

* cited by examiner

*Primary Examiner* — Gene Crawford
*Assistant Examiner* — Lester Rushin
(74) *Attorney, Agent, or Firm* — Caseiro Burke, LLC; Chris A. Caseiro (57) ABSTRACT

A conveyor is provided which is particularly suited for use in a helical conveyor path where limited footprint space is available. The conveyor includes belt (4) with flights comprised of conveying portions (41) and holding portions (41a). Each of the portions has forward projections and rear projections, the forward projections being staggered relative to the rear projections so that adjacent flights can be interconnected by connection between staggered projection of the adjacent flight. The holding portions (41a) are provided with an upstanding projection (47) which serves to retain product placed on the conveyor in a desired orientation as the conveyor travels along the helical path.

11 Claims, 8 Drawing Sheets

CONVEYOR

CROSS REFERENCE TO RELATED APPLICATIONS

This application is a National Stage application of PCT/EP2010/060872, filed Jul. 27, 2010, which claims priority from Ireland patent application S2009/0591, filed Jul. 30, 2009. The entire content of the priority application is incorporated herein by reference.

BACKGROUND OF THE INVENTION

1. Field of the Invention

The present invention relates to a conveyor, in particular to a conveyor adapted to travel along a helical or spiral path.

2. Description of the Prior Art

Conveyor systems for use in food handling and processing are well known, whereby conveyor belts, are employed to transfer articles between various locations and/or through various stages of the manufacturing process. Such conveyor belts are commonly formed of materials resistant to temperature degradation in the range −40° C. to 118° C. and which are readily cleanable, for example, plastics materials. In certain applications it is desirable or required that articles being transferred by the conveyor maintain a particular orientation relative to the conveyor's path or indeed maintain a particular desired orientation or spacing relative to the other items on the conveyor. This requirement is particularly important where the articles should be presented correctly in order to ensure that processes along a production line are administered effectively or to ensure that they maintain an optimal configuration to allow for rapid packaging.

However, articles often have to be transferred along conveyors which follow inclined, curved paths. Such helical or spiral conveyors are well known. In some situations the windings of helical conveyors have small radii or involve various inclines or declines as a result of factors such as limited available space or optimal production line design. In such instances where conveyors follow these convoluted and tortuous paths, it is common that the articles thereon become misaligned or misspaced and must then be returned to a correct orientation either by the use of ancillary equipment or through the manual intervention of production line operators. The use of such equipment or personnel not only contributes to increased costs but also increases the degree of handling which the articles are subject to and as such can be detrimental to the quality of the articles, particularly where they comprise delicate items or foodstuffs.

SUMMARY OF THE INVENTION

It is therefore an object of the present invention to alleviate the disadvantages associated with the prior art.

Accordingly, the present invention provides a conveyor for conveying articles in a continuous flow along a helical path in a generally vertical direction, the conveyor comprising a belt having a plurality of conveying portions adapted to be interlinked so as to permit travel around windings on the helical path, the belt being further provided with at least one holding portion having retaining means for retaining articles in a desired orientation relative to the conveyor's helical path once placed upon the belt, each of the conveying portions and holding portions defining a flight.

An advantage of this conveyor is that once the articles are placed on the conveyor belt they are retained in the same position regardless of the length or the pitch of the path travelled by the conveyor. A further advantage is that the articles are also retained in the correct orientation relative to the conveyor's path and indeed relative to other articles present on the conveyor. These advantages allow the pitch of a conveyor to be varied, for example increased significantly, without the articles placed thereon becoming misaligned or misspaced. This avoids the need for ancillary equipment to correct such problems.

In one embodiment of the invention each of the conveying portions comprise a plurality of interconnected flights each flight including a first member having a leading face and a trailing face relative to a longitudinal axis of the first face. In this embodiment of the invention each member further includes a series of spaced apart forward projections extending from the leading face and a series of spaced apart rear projections extending from the trailing face. Advantageously the spaced apart projections are offset from each other along the longitudinal axis of the first member such that the forward projections and the rear projections lie in a mutually staggered relationship.

In an embodiment of the invention holding portions are placed at regular intervals intermediate the conveying portions along the belt. Conveniently each holding portion comprises second flights that are similar to the interconnected flights of the conveying portion in that the flights comprise a member having a leading face and a trailing face relative to a longitudinal axis of the second member, with a series of spaced apart forward projections extending from the leading face and a series of spaced apart rear projections extending from the trailing face, the forward spaced apart projections and rear spaced apart projections being offset from each other along the longitudinal axis of the second member so that the forward projections and the rear projections lie in a mutually staggered relationship, the projections of the holding portion being sized and shaped to enable the holding portion to interconnect with adjacent conveying portions and/or holding portions of the belt. In the preferred embodiment the flights comprising the holding portion further comprise retaining means in the form of an upwardly projecting edge intermediate the leading and trailing faces to provide an elongate raised formation. Conveniently when the holding portion is in position on the conveyor the elongate raised formation extends substantially across the width of the conveyor belt. Advantageously once articles are deposited onto the conveyor they abut against and are retained by the elongate raised formation and are thus maintained in a desired orientation and relative spacing along the belt throughout its travel.

Conveniently both the conveying portion and the holding portion have at least one uniform, ideally planar, face. In the preferred embodiment of the invention the uniform face is positioned on the underside of the conveyor belt remote from the retaining means. In this way the underside of the conveyor belt is kept free from obstructions to ensure a smooth return.

In a preferred embodiment of the invention the conveying portions and holding portions are arranged such that each forward projection provided on a particular flight is located between two rear projections on the next adjacent flight thereby interconnecting each of the adjacent conveying portions and/or holding portions.

Optionally in a preferred embodiment of the invention each projection is provided with an opening. Ideally when the conveying portions and/or holding portions are arranged such that each forward projection provided on a particular flight is located between two rear projections on the next adjacent flight their respective openings are in mutual alignment thus enabling a linkage means, such as a rod, to be placed through said openings thereby securely linking said conveying portions and/or holding portions together. It is of course understood by the person skilled in the art that this is one mechanism of securely linking the conveying portions and/or holding portions together. Any other suitable mechanism or means known to the person skilled in the art could also be used for this purpose.

Optionally the openings are in the form of an elongate aperture or slot. Conveniently the elongate nature of the openings and their size and shape are selected to enable adjacent conveying portions to either move closer together or to move further apart thereby giving belt flexibility in horizontal and vertical planes. The advantage of this is that the conveyor belt is able to follow a helical path without buckling on its innermost side and without breaking on its outermost side.

In a further embodiment of the invention the conveyor further comprises a return portion extending between opposing ends of the helical path. Conveniently the conveyor belt is driven around the conveyor using conventional means such as one or more drives, at least one pulling means and a plurality of sprockets for guiding the conveyor belt around the conveyor path both horizontally and vertically. For example, in one arrangement a drive is located at the top of the vertical return section just where the belt of the conveyor goes into a horizontal orientation to accept product.

Optionally the flights of the conveying portion and holding portion are formed from materials resistant to degradation in the temperature range −40° C. to 118° C. and which are readily cleanable. Examples of such material include plastics such as Acetal™, Propylene™ and Nylon 2™.

The invention will hereinafter be more particularly described with reference to the accompanying drawings which show, by way of example only, the conveyor of the invention.

DETAILED DESCRIPTION OF THE INVENTION

Referring initially to FIG. 1, FIG. 2a, FIG. 2b and FIG. 2c, there is shown a continuous flow conveyor 1 adapted to convey articles along a helical path. In this embodiment a downward path direction is being used. Conveyor 1 comprises a central column 2 and a helical frame 3 extending around the column and fixed thereto, said column being supported at its base by a plurality of support members 2a. The helical frame 3 comprises inner and outer guides 3a and 3b, respectively, which are connected by a plurality of spaced-apart radial support beams 31. A plurality of offset helical sections 32 which intersect the support beams 31 are interposed between the inner guide 3a and outer guide 3b. At the respective upper and lower terminal ends of the conveyor, the frame 3 is further provided with extension sections 33, 34 (FIG. 2c) which provide substantially straight entry and exit points to the helical frame 3.

Figure 1:
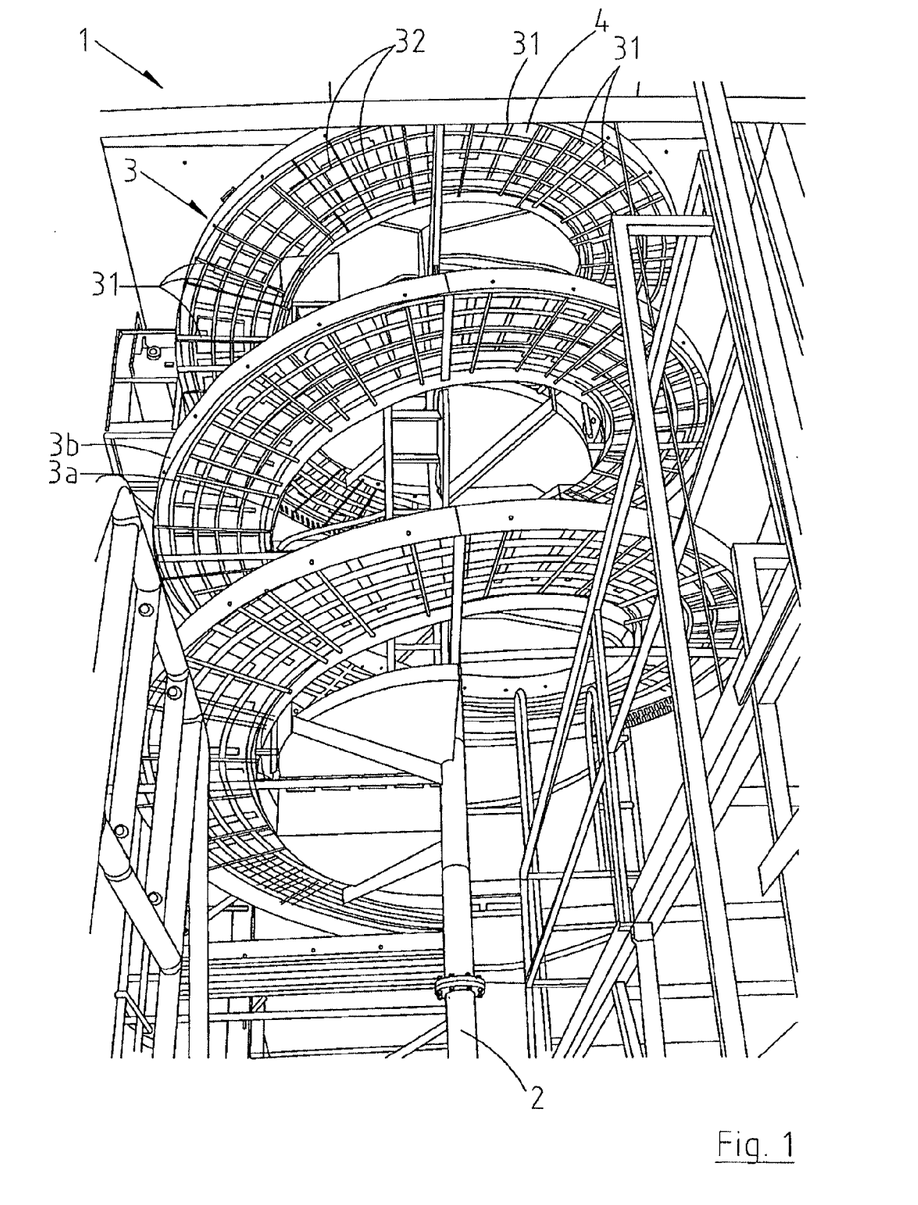
FIG. 1 shows a helical conveyor in accordance with the invention.
Figure 2A:
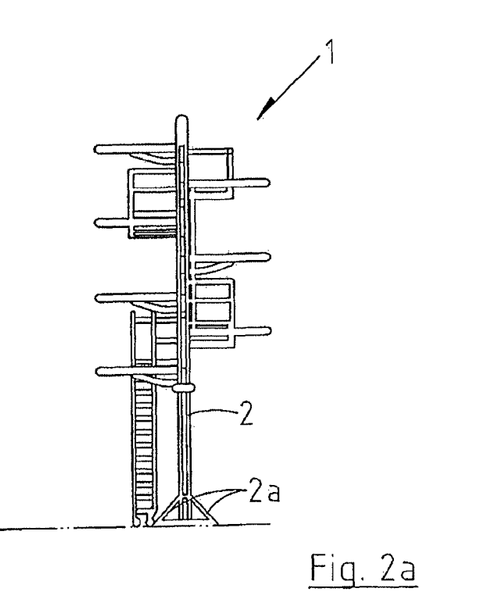
FIG. 2a is a schematic illustration of the helical conveyor.
Figure 2B:
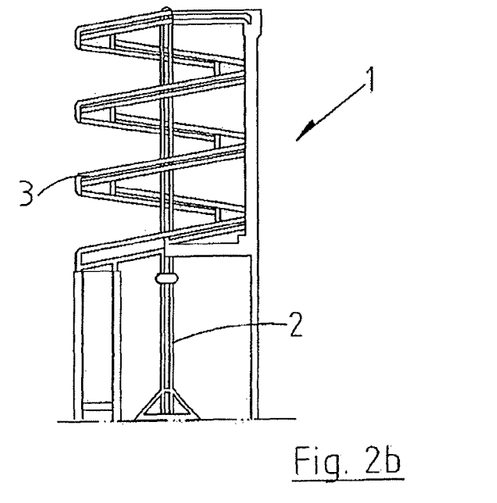
FIG. 2b is a schematic illustration of a central column of the helical conveyor and FIG. 2c is a view thereof from above.
Figure 2C:
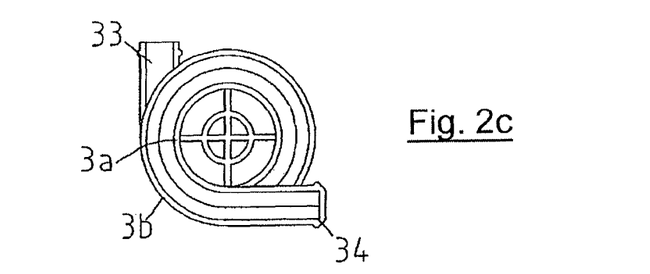
Figure 2D:
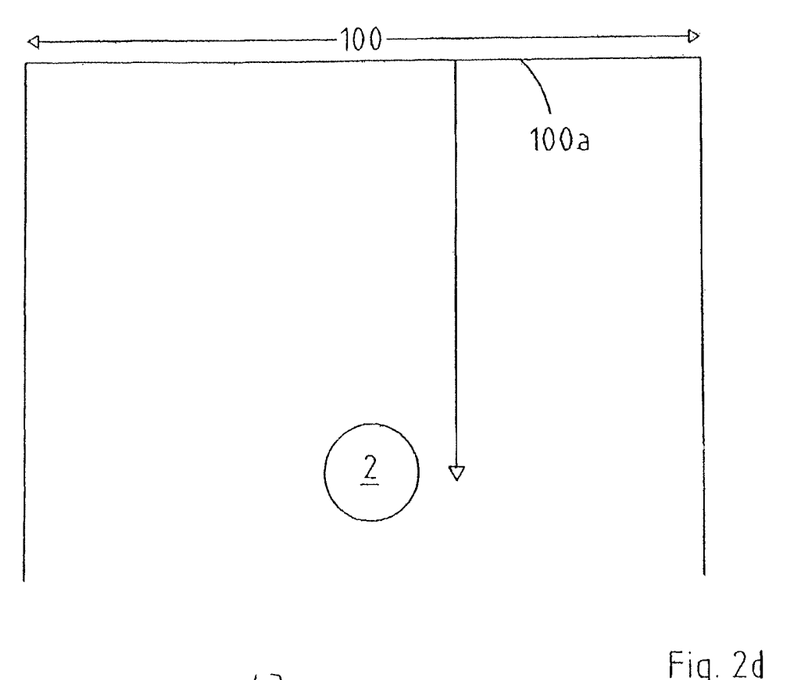
FIG. 2d is an example of an instance where a small footprint is available for a helical
Figure 3:
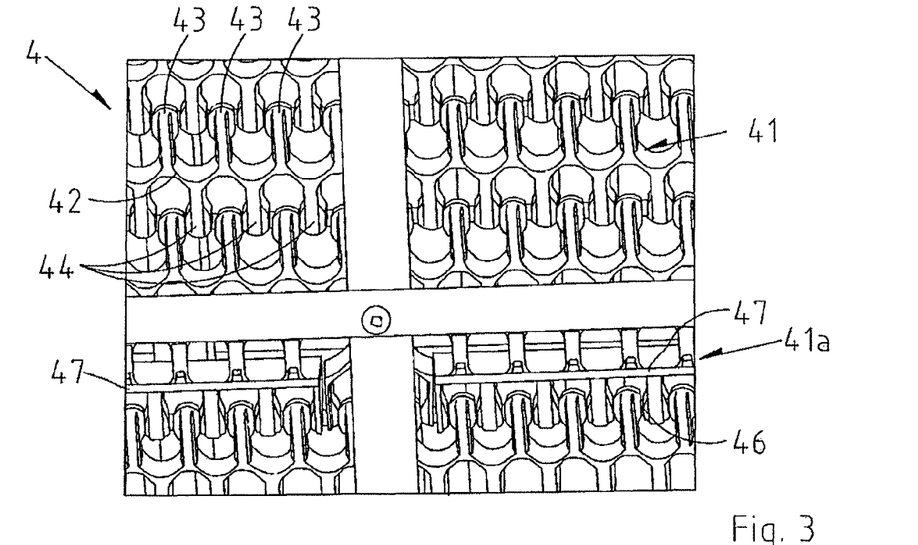
FIG. 3 is a detailed view of the conveyor belt of the invention.

The helical path of continuous flow conveyor 1 of FIG. 1 comprises three windings around the central column 2. FIG. 2d, shows an example of a small footprint available for a helical conveyor of the invention, where the area available to place a helical conveyor is limited and comprises a room 100 approximately 5 meters wide. The central column 2 of the conveyor is placed approximately 5 meters from the rear wall 100a. In such situation the radius of the helical path is quite small thus the speed at which the portions of the conveyor belt turn through 360° is quite fast. It is possible to overcome this problem by increasing the number of windings around the central column 2, however this solution increases the time it takes to transfer the articles being conveyed from one location to another. There are also problems associated with pulling the belt around the conveyor due to frictional and vibrational forces. In many instances this is an undesirable solution. Previously it was not possible to increase the pitch of the helical conveyor as this would cause misalignment or misspacing of the articles being conveyed.

Referring now to FIG. 3, FIG. 4, FIG. 4a, FIG. 4b and FIG. 4c, an endless belt 4, which is adapted to follow the path of frame 3 as defined by guides 3a and 3b and which comprises a plurality of interconnected conveying portions 41, and holding portions 41a which comprises flights, is driven by a motor (not shown). Each portion 41, 41a comprises a member 42, each member having a series of spaced apart forward projections 43 extending from its leading face and a series of spaced apart rear projections 44 extending from its trailing face, each series of spaced apart projections being offset from each other along the longitudinal axis of said member such that the forward projections 43 and the rear projections 44 lie in a mutually staggered relationship. Openings 45 in the form of elongate apertures or slots are formed through projections 43, 44. The conveying portions 41 and holding portions 41a are arranged such that each forward projection 43 provided on a particular flight is located between two rear projections 44 on the next adjacent flight so that their respective openings 45 are in mutual alignment. This enables a linkage means, such as a rod 46, to be placed through said openings thereby linking said adjacent flights together.

The slotted nature of the openings 45 enables adjacent flights, which are portions 41, 41a, to either mesh closer together or to move further apart thereby giving belt 4 flexibility in both horizontal and vertical planes as the belt moves in a helical path.

Figure 4:
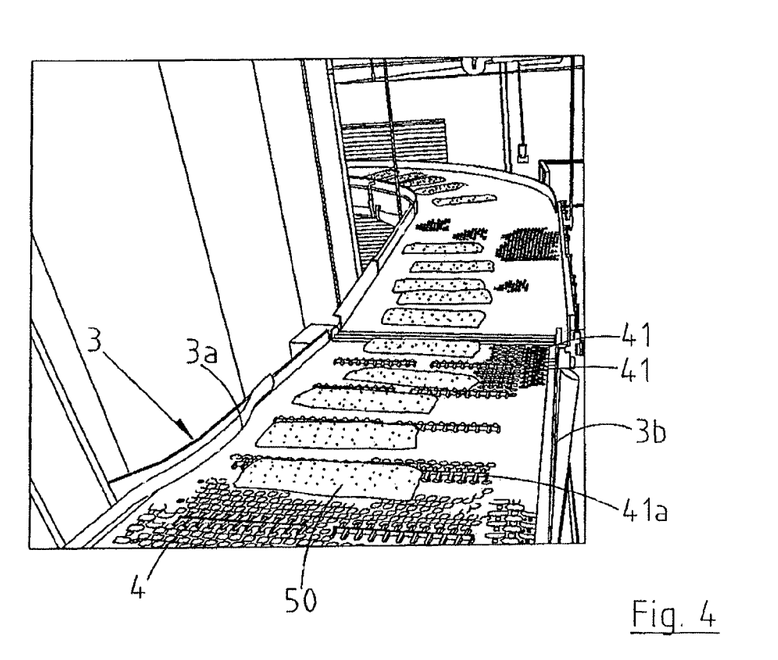
FIG. 4 illustrates the orientation of articles exiting the helical conveyor.
Figure 4A:
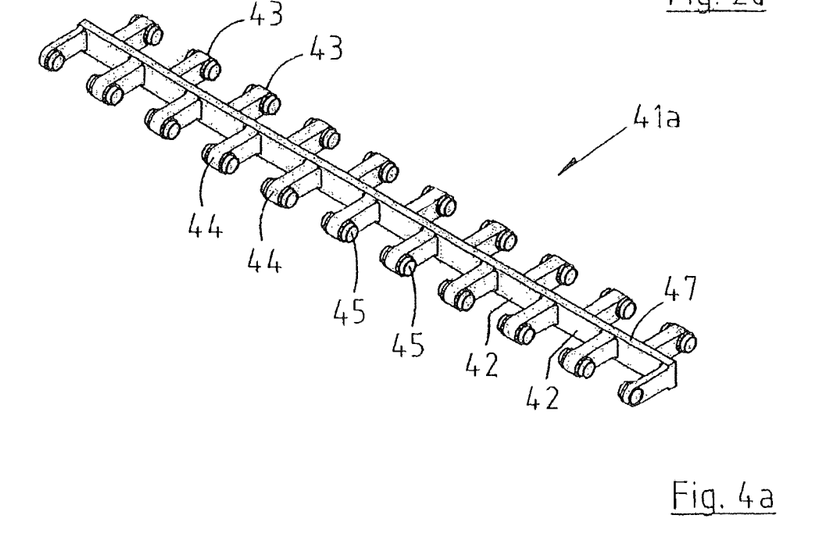
FIG. 4a is an enlarged perspective view of a holding portion of the conveyor illustrated in FIG. 4.
Figure 4B:
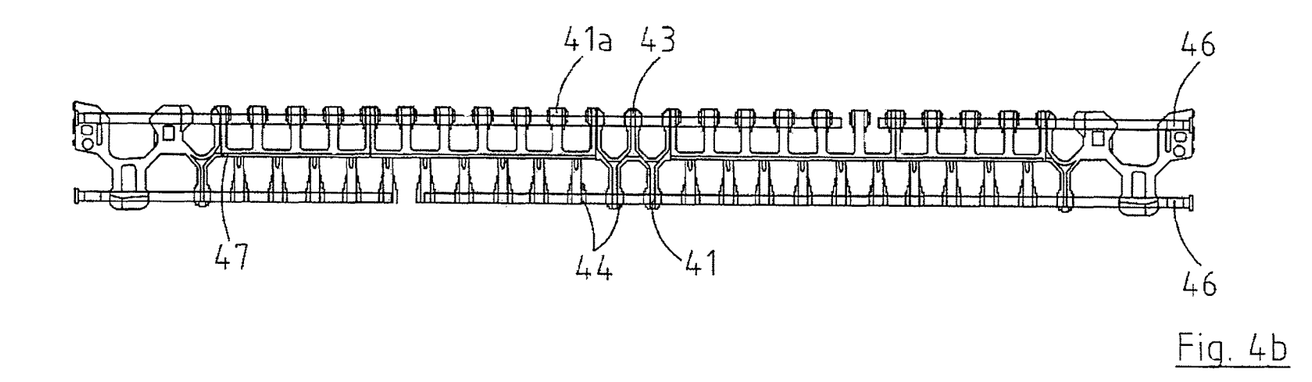
FIG. 4b is an enlarged plan view of two holding portions connected to conveying portions of the conveyor illustrated in FIG. 4.
Figure 4C:
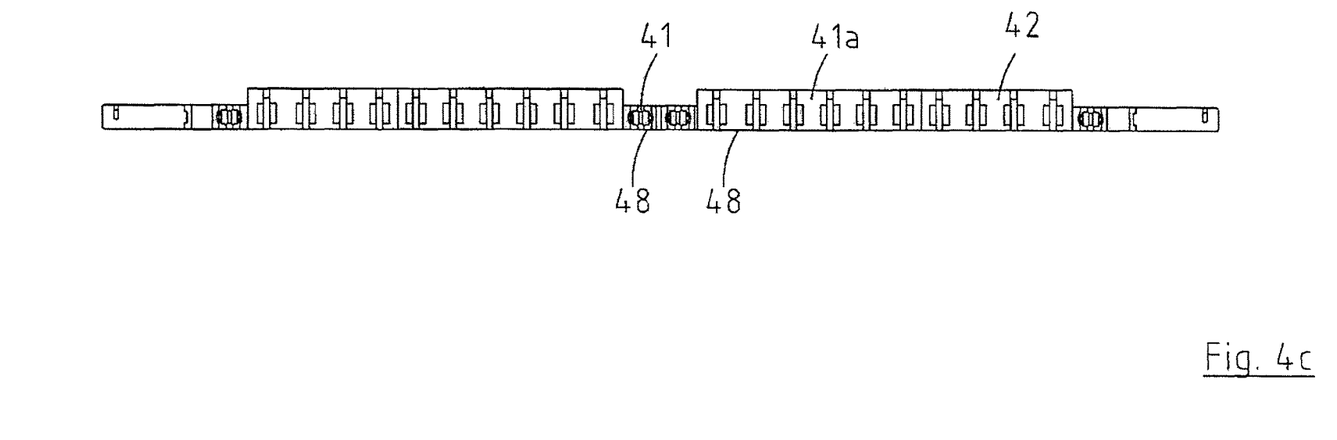
FIG. 4c is a cross sectional side view of the holding and conveying portions of FIG. 4b.

Consequently this allows belt 4 to follow the helical path without buckling on its innermost side and without breaking on its outermost side. Flights 41*a*, which are placed at regular intervals along the belt 4, each comprise a member 42 having an upwardly projecting edge 47 which provides an elongate raised formation extending substantially across the width of the belt (FIG. 4*c*). Articles 50 which are deposited onto the conveyor abut against, and are retained by, projecting edges 47 and are thus maintained in a correct orientation and relative spacing along the belt throughout its travel. The underside 48 of member 42 intermediate forward projections 43 and rear projections 44 has a planar face. Thus the underside 48 of the conveyor belt is free from obstructions thereby ensuring the conveyor belt has a smooth return during the endless cycle. (See also FIGS. 5 and 8).

Figure 5:
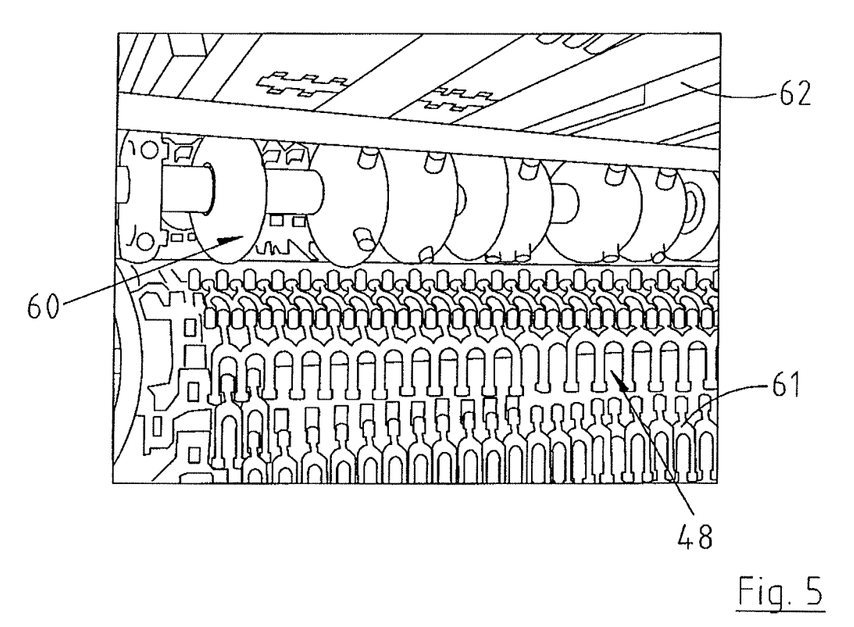
FIGS. 5 and 6 show the drive sprockets of a helical conveyor in accordance with the invention.
Figure 6:
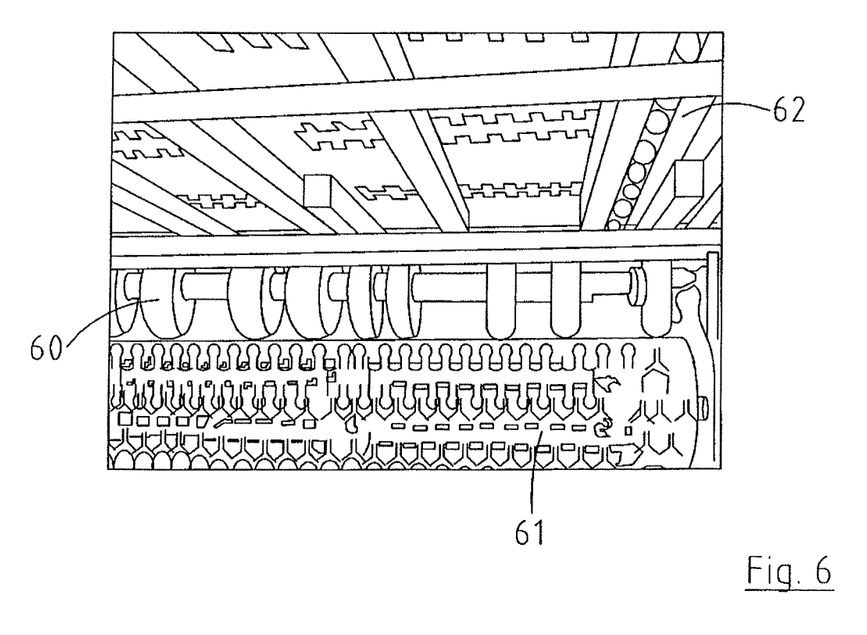
Figure 7:
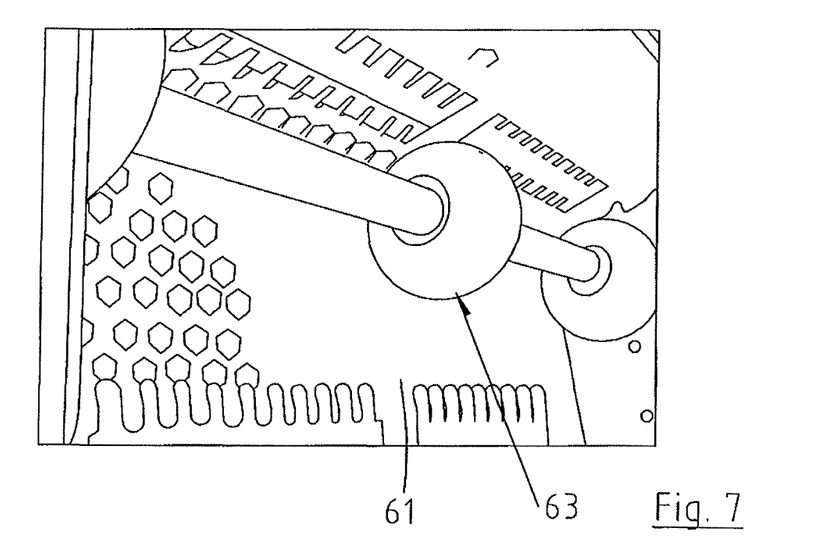
FIG. 7 shows the tension rollers of a helical conveyor in accordance with the invention.
Figure 8:
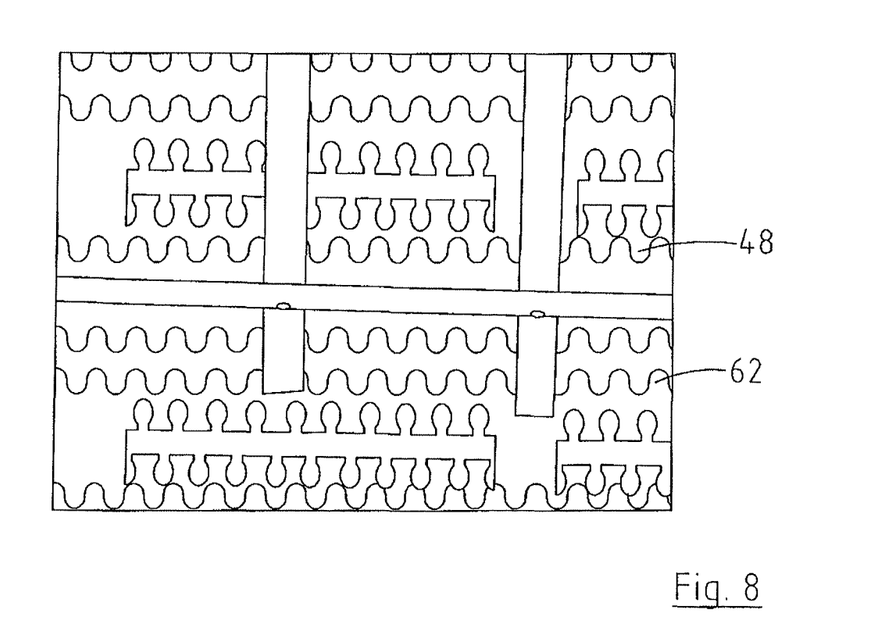
FIG. 8 shows a horizontal section of the helical conveyor comprising conveying portions and holding portions in accordance with the invention.
Figure 9:
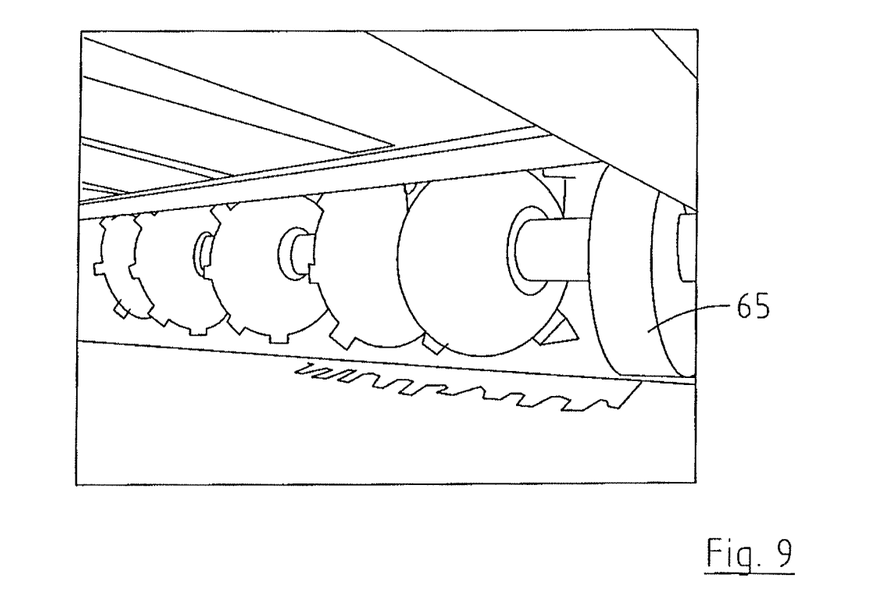
FIG. 9 shows the idle return of a helical conveyor in accordance with the invention.

Referring now to FIGS. 5 to 9, there are shown a series of diagrams of sections of conveyor 1 being driven around an endless path. FIGS. 5 and 6 show drive sprockets 60 which maintain the endless belt 4 in correct alignment as it moves from a vertical plane 61 to a horizontal plane 62. FIG. 7 shows a tension roller 63 at the top of a vertical plane 61 prior to drive sprockets (not shown) picking up endless belt 4. FIG. 8 is a view of the underside 48 of a horizontal section 62 of endless belt 4 prior to entering a vertical plane 61. FIG. 9 shows the idle return 65 of the endless belt 4 at the end of the helical path of the conveyor 1.

Figure 10:
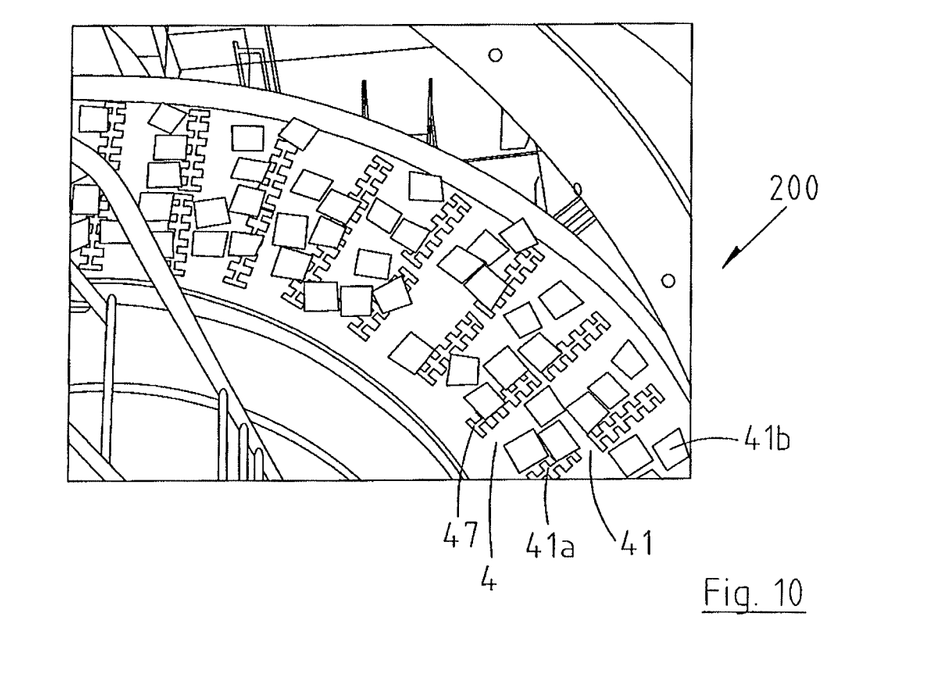
FIG. 10 shows the retaining means holding back product as it is being transported by a helical conveyor in accordance with the invention.

Referring now to FIG. 10 there is a shown an example of a helical conveyor 200 of the invention comprising both conveying portions 41 and holding portions 41*a*. Holding portions 41*a* of endless belt 4 are retaining articles 41*b* in the same position and orientation as they were in when placed upon the belt as they move along a helical path in a downward direction.

While the conveyor is described above as travelling in a downward direction as it carries product, it will be appreciated that the invention also encompasses the situation where product is to be carried in an upward direction. It will also be appreciated that the footprint size, pitch and length of the conveyor can be selected to match the particular requirements in the space in which the conveyor is to operate. The arrangement of the conveyor according to the invention is particularly suitable for use in spaces where there is limited footprint capacity for the helical conveyor, as the portions which comprise the conveyor flights are interconnected and formed so as to be relatively flexibly movable in horizontal and vertical directions. This enables the belt to move through a helical path with the belt opening on the outer side of the helix path and compressing on the inner side as it moves while still retaining product on the belt in a desired orientation.

Furthermore, the elements of the flights can be comprised of suitable plastic materials which are amenable to cleaning, ideally to cleaning in position using readily available cleaning agents. The suitability for easy cleaning makes the helical conveyor of the present invention particularly suitable for use in plants that produce comestibles, pharmaceuticals and other products for consumption or application to humans or animals.

It is thought that the present invention and its advantages will be understood from the foregoing description and it will be apparent that various changes may be made thereto without departing from the scope of the invention as defined by the appended claims, the forms hereinbefore described being merely preferred or exemplary embodiments thereof.

The invention claimed is:

1. A conveyor for conveying articles in a continuous flow along a helical path in a generally vertical direction, the conveyor comprising:

a belt having a plurality of conveying portions adapted to be interlinked so as to permit travel around windings on the helical path;

each conveying portion having a plurality of interconnected first flights, each first flight including a first member having a leading face and a trailing face relative to a longitudinal axis of the first member and each first member includes a series of spaced apart forward projections extending from the leading face and a series of spaced apart rear projections extending from the trailing face;

the belt comprising a plurality of holding portions positioned at intervals intermediate the conveying portions along the belt, each holding portion including a second flight adapted to interlink with adjacent conveying portions and/or holding portions of the belt, each holding portion having retaining means for retaining articles in a desired orientation relative to the conveyor's helical path once placed upon the belt, the retaining means in the form of an integrally formed upwardly projecting edge of the second flight which provides an elongate raised formation extending substantially across the width of the conveyor belt, and each of the conveying portions and holding portions defining a flight.

2. A conveyor according to claim 1, in which the forward spaced apart projections and rear spaced apart projections are offset from each other along the longitudinal axis of the first member so that the forward projections and the rear projections lie in a mutually staggered relationship.

3. A conveyor according to claim 1, in which the second flight of each holding portion includes a second member having a leading face and a trailing face relative to a longitudinal axis of the second member, with a series of spaced apart forward projections extending from the leading face and a series of spaced apart rear projections extending from the trailing face, the forward spaced apart projections and rear spaced apart projections being offset from each other along the longitudinal axis of the second member so that the forward projections and the rear projections lie in a mutually staggered relationship, the projections of the holding portion being sized and shaped to enable the holding portion to interconnect with adjacent conveying portions and/or holding portions of the belt.

4. A conveyor according to claim 3, in which the integrally formed upwardly projecting edge of each retaining means is intermediate the leading and trailing faces of the second flight.

5. A conveyor according to claim 1, in which articles deposited on the conveyor abut against and are retained by the elongate raised formation and are maintained by the elongate raised formation in a desired orientation and relative spacing along the belt throughout its travel.

6. A conveyor according to claim 1, in which each conveying portion and holding portion present at least one uniform face positioned on the underside of the conveyor belt remote from the retaining means.

7. A conveyor according to claim 2, in which the conveying portions and holding portions are arranged such that each forward projection provided on a particular flight is located between two rear projections on the next adjacent flight thereby interconnecting each of the adjacent conveying portions, each of the adjacent holding portions or both the adjacent conveying portions and the adjacent holding portions.

8. A conveyor according to claim 2, in which each projection is provided with an opening with each forward projection of a particular flight located between two rear projections of the next adjacent flight, the openings being in mutual alignment to define a channel for receiving a linkage means placed through said openings thereby securely linking said conveying portions and/or holding portions together.

10. A conveyor according to claim 8, in which the openings are in the form of an elongate aperture or slot sized and shaped to allow adjacent conveying and/or holding portions to move closer together or move further apart thereby providing belt flexibility in horizontal and vertical planes.

10. A conveyor according to claim 1, in which the flights defined by the conveying portions and holding portions are formed from materials resistant to degradation in the temperature range −40° C. to 118° C. and are readily cleanable.

11. A conveyor according to claim 1, further comprising a return portion extending between opposing ends of the helical path.

* * * * *